Nov. 15, 1938.   A. KNECHT   2,136,853
FILTER
Filed Dec. 16, 1935   2 Sheets-Sheet 1

Inventor
Alfred Knecht
by Karl Lishauer
Atty.

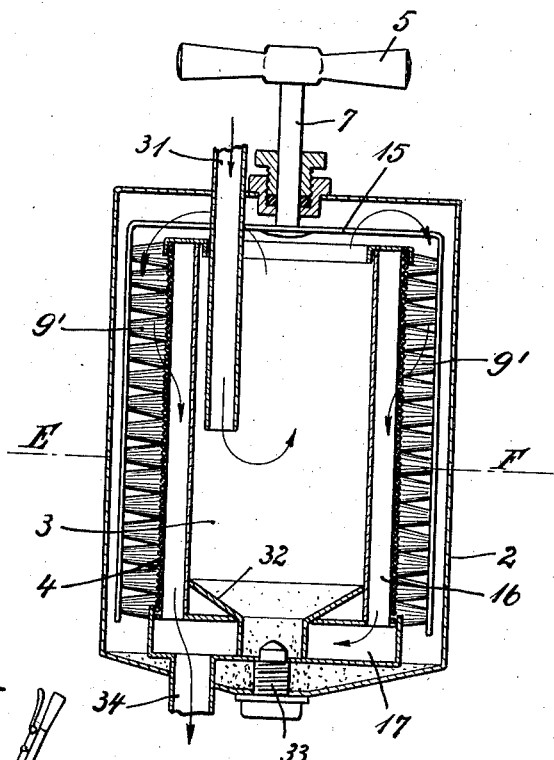
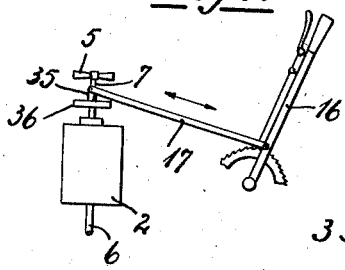
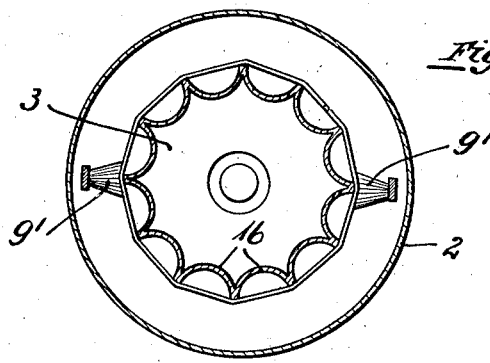

Patented Nov. 15, 1938

2,136,853

UNITED STATES PATENT OFFICE 2,136,853

FILTER

Alfred Knecht, Stuttgart-Bad-Cannstatt, Germany

Application December 16, 1935, Serial No. 54,587
In Germany December 22, 1934

5 Claims. (Cl. 210—167)

My invention relates to filters and more especially to means for filtering liquids or air and gases, more especially such as are fed to internal combustion engines.

The invention relates more particularly to the combination, with a filter of the kind described, of means for keeping the filtering surface free, or for freeing same, from the solid matter suspended in the liquid or gas and which settles on the surface of the filter.

The invention has particular reference to filters of the kind aforesaid, the filtering element of which is formed by a plurality of substantially parallelly extending wires, preferably of circular cross section or by a single coiled wire.

In order to render filters of this particular kind suitable for continuous use, I combine with them means for keeping the filtering surface clean by mechanical action. I prefer providing a brush or brushes arranged in contact with the filter surface and capable of a movement relative to and in contact with this surface, while the filter is in operation, the relative movement of the brush or brushes occurring in the longitudinal direction of the wire or wires forming this surface.

I thus obtain a particularly efficient and speedy removal of the dirt and other residual matter retained by the wires which form the filter or sieve, so that this latter is always kept in a state, wherein it is highly permeable for the fluid to be purified.

Figure 3:
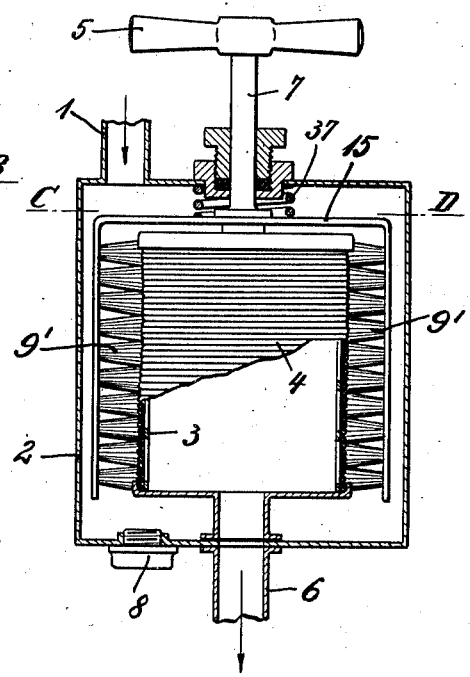
Figure 4:
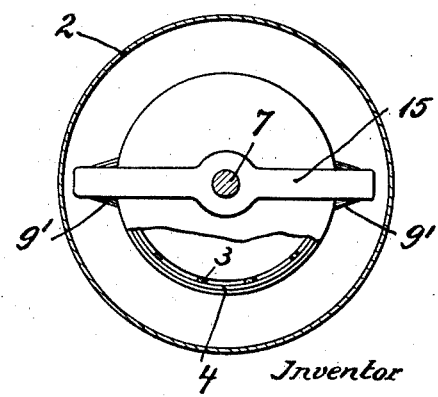

In the drawings affixed to this specification and forming part thereof three filters embodying my invention are illustrated diagrammatically by way of example. In the drawings, Figs. 1, 3 and 5 are axial sections of the three modifications, while Figs. 2, 4 and 6 are cross sections on the lines A—B in Fig. 1, C—D in Fig. 3 and E—F in Fig. 5, respectively.

Fig. 7 is a diagrammatic showing of means of coupling the cleaning device with the brake lever of a motor car.

Figure 1:
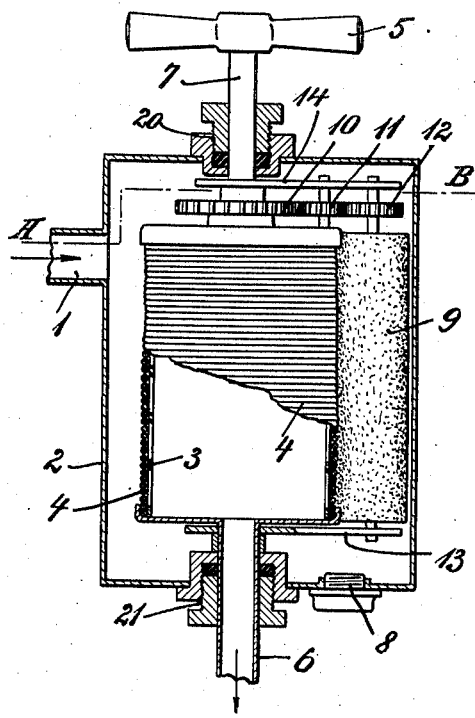
Figure 2:
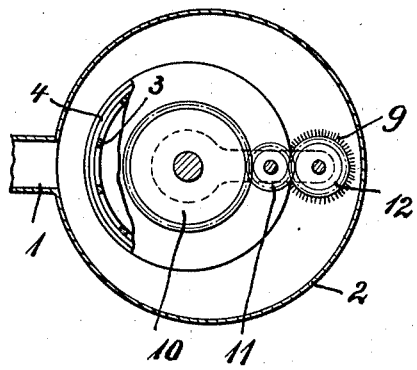

Referring to the drawings and first to Fig. 1, 1 is the inflow pipe of the filter casing 2. 3 is the cylinder carrying the filter element and 4 is the wire wound around the surface of the carrier 3 in a spiral. 5 is a handle mounted on the axle 7 fixed to the filter carrier 3, and 6 is the outflow pipe fixed to the bottom of the filter. Both the axle 7 and the outflow pipe 6 are packed relative to the casing 2 by means of stuffing boxes 20 and 21, respectively.

The individual windings of the spiral of the coiled wire 4 are spaced on the perforated cylinder 3 in a uniform manner, for instance by arranging the windings of the wire on strips of a plastic material such as lead arranged in the axial direction of the cylinder.

8 is a tap screw closing a tap hole in the casing 2 which serves for the removal of sludge.

9 is a cylindrical brush mounted for rotation in arms 13 and 14 secured to the outflow pipe 6 and the axle 7, respectively. On the axle 7 is keyed a toothed wheel 10 meshing with an intermediate wheel 11 which drives the pinion 12 secured to the brush axle, whereby the brush is forced to rotate in the same circumferential direction as the filter cylinder.

In the operation of the device the fluid entering the casing at 1 flows through the gaps between adjoining windings of the wire 4 and escapes through the outflow pipe 6. Whenever it is desired to clean the filter surface, the brush 9 is set rotating by turning the axle 7 by means of the handle 5. The ends of the bristles 9 in contact with the wire surface will then remove all solid matter which has settled on this surface and will clean the surface altogether.

Instead of a cylindrical brush I may also employ a cleaning device having the form of a cylinder composed of a plurality of felt rings or the like.

In the modification shown in Fig. 3 the casing 3 carrying the coiled wire 4 is fixed in the casing 2, only the brush being secured to the handle 5 for rotation relative to the filter. This brush is here constituted by two rows of bristles 9' mounted on the inner sides of the parallel arms of a fork-shaped carrier 15 fixed to the axle 7.

In the modification illustrated in Figs. 5 and 6 the brush or cleaning device is substantially identical with that shown in Fig. 3, however here the cylindrical filter carrier, instead of being perforated as in Figs. 1 and 3, is fluted as shown at 16 (Fig. 6), being formed from a plurality of channels arranged in juxtaposition in a circle and the edge portions of which are united, thus forming a polygonal carrier for the wire filter.

Here the inflow pipe 31 extends axially into the filter carrier, and a funnel-shaped bottom 32 is provided, in which the sludge may settle, a tap screw allowing the sludge to be removed from time to time. The fluid to be filtered and which fills the filter carrier flows over the top edge of the carrier into the space enclosed between the casing wall 2 and the filter and in passing through between the wires 4 enters the channels 16, escaping through the outflow pipe 34 communicating with the collecting chamber 17 below these channels, as shown by the arrows.

If it is desired to use the filter in connection with a motor vehicle, the power required for setting the brush operating may be derived from some lever, which is operated from time to time for other purposes. This may be the lever operating the hand brake, the foot brake, the clutch pedal, the gas lever, the steering pillar etc. By thus connecting the brush with a repeatedly operated part of the car I provide for a repeated cleaning of the filter. I have found it particularly useful to connect the brush with the hand brake lever, as shown in Fig. 7, where 17 is a rod connecting the lever 16 to a crank 35 mounted on a disk 36 secured to the axle 7. I may, however, also provide means for automatically moving the brush device.

In order to be able to also move the brush independently from other members, I may provide a separate pedal lever or the like cooperating with or replacing the handle 5, similarly as in the case of certain central lubricating arrangements.

While in the modifications described above a single wire helically wound with the turns of the helix in close juxtaposition is used, a plurality of substantially parallelly extending wires may also be employed to form a similar filter body. The said helix may be formed all over its entire length with uniform, preferably circular cross section. In any case I prefer to use round wire or wire of substantially circular cross section to build up the filter body proper.

The brush device may also be arranged for a movement comprising an axial component, for instance in a spiral line or a composite movement comprising a component in circumferential direction and another component in axial direction. Separate means may be provided for bringing about these different components.

Preferably springs such as 37 in Fig. 3 may be inserted between the brush device and the part supporting same.

I wish it to be understood that I do not desire to be limited to the exact details of construction shown and described for obvious modifications will occur to a person skilled in the art.

I claim:

1. In a filter in combination, a casing, a fluted carrier in said casing, a wire wound around said carrier and forming the filter body proper, a brushing device in contact with and movable relative to said wire, means projecting from said casing for moving said brushing device, a sludge collector at the bottom of said carrier, another sludge collector below said first collector and common tapping means for the sludge accumulating in the two collectors.

2. In a filter in combination, a casing, a carrier in said casing, a wire wound around said carrier to form a hollow cylinder adapted to act as the filter body proper, means for causing the fluid to be filtered to flow always in the same direction into said filter body, a brushing device in contact with the outer surface of said filter body and movable relative to, and substantially in the longitudinal direction of, said wire and means projecting from said casing for moving said brushing device.

3. In a filter in combination, a filter body comprising a helically wound wire of substantially circular cross section with the turns of the helix in close juxtaposition, a brushing device arranged in contact with the outer surface of said helix, means for producing relative movements between said filter body and said brushing device substantially in the longitudinal direction of said turns, and means for causing the fluid to be filtered to flow always in the same direction into said helix.

4. In a filter in combination, a filter body comprising a helically wound wire of substantially circular cross section with the turns of the helix in close juxtaposition, a brushing device arranged in contact with the outer surface of said helix, means for producing relative rotative movements between said filter body and said brushing device about the axis of said helix, and means for causing the fluid to be filtered to flow always in the same direction into said helix.

5. In a filter in combination, a casing, a fluted carrier in said casing, a wire wound around said carrier and forming the filter body proper, means for causing the fluid to be filtered to flow always in the same direction from the outside to the interior of said filter body, a brushing device in contact with the outer surface of said filter body, means for producing relative rotatory movements between said filter body and said brushing device substantially in the longitudinal direction of said wire, and a sludge collector at the bottom of said carrier.

ALFRED KNECHT.